United States Patent [19]

Carena et al.

[11] Patent Number: 4,683,501
[45] Date of Patent: Jul. 28, 1987

[54] APPARATUS FOR READING AND REPRODUCING GRAPHIC INFORMATION

[75] Inventors: Ugo Carena, Ivrea; Giuseppe Coli, Pavon Canavese; Giuseppe Fogaroli, Ivrea, all of Italy

[73] Assignee: Ing. C. Olivetti & C., S.p.A., Ivrea, Italy

[21] Appl. No.: 783,352

[22] Filed: Oct. 3, 1985

[30] Foreign Application Priority Data

Oct. 3, 1984 [IT] Italy ............... 67982 A/84

[51] Int. Cl.$^4$ ............................... H04N 1/024
[52] U.S. Cl. ........................... 358/293; 358/294; 250/239
[58] Field of Search ................ 358/294, 293; 250/239

[56] References Cited

U.S. PATENT DOCUMENTS

| | | | |
|---|---|---|---|
| 1,828,000 | 10/1931 | Ranger | 358/294 |
| 3,483,385 | 12/1969 | Heaslip | 250/239 |
| 3,535,525 | 10/1970 | Minkowitz | 250/239 |
| 3,684,889 | 8/1972 | Preissnetz | 358/294 |
| 3,735,094 | 5/1973 | Dunn | 250/239 |
| 4,523,235 | 6/1985 | Rajchman | 358/293 |
| 4,566,779 | 1/1986 | Coli | 355/3 R |

FOREIGN PATENT DOCUMENTS 56-34273  4/1981  Japan ................... 358/294

OTHER PUBLICATIONS

*IBM Technical Disclosure Bulletin*, vol. 20, No. 4, Sep. 1977, p. 1299 "Scanning Typewriter", Dattilo et al.

Primary Examiner—Howard W. Britton
Attorney, Agent, or Firm—Banner, Birch, McKie & Beckett

[57] ABSTRACT

A device for reading graphic symbols impressed on a sheet, comprising light sources for illuminating the sheet, an optical reading system and an array of photoelectric sensors for generating electrical reading signals. The device is compact in structure and of small dimensions, so as to allow it to be mounted upon the head-carrying carriage of a printing machine or typewriter. The device makes it possible to create, in a particularly simple form, reading apparatus for facsimiles or for optical character recognition (OCR) reading apparatus for memorizing signatures, graphical symbols and drawings or mathematical symbols, or apparatus for copying documents.

7 Claims, 6 Drawing Figures

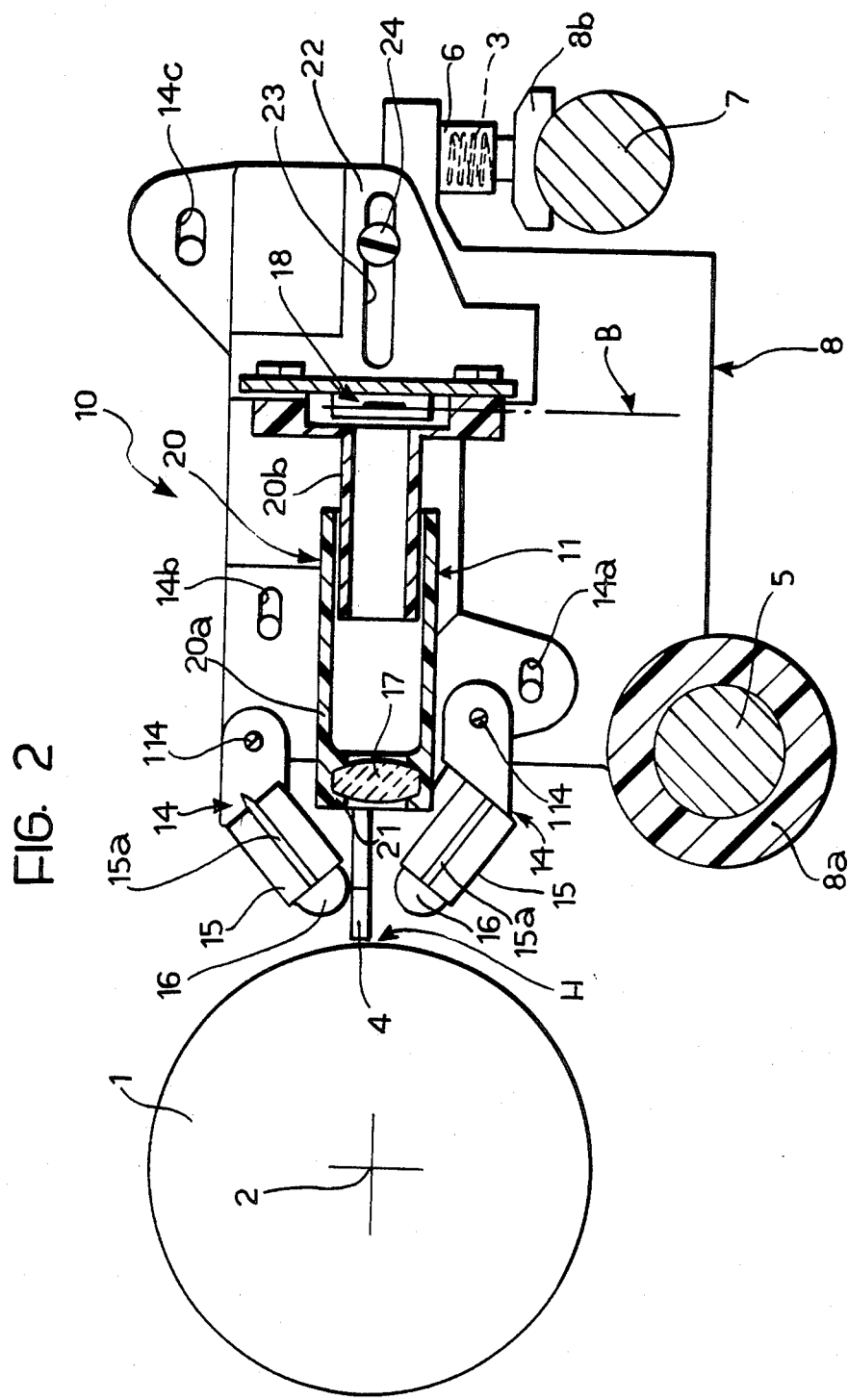

APPARATUS FOR READING AND REPRODUCING GRAPHIC INFORMATION

This invention relates to an apparatus for reading and reproducing graphic information, including a device for reading graphic information on a substrate in the form of, for example, a sheet.

Such devices are currently used in readers for facsimile or for Optical Character Recognition (OCR) or as an input unit for processor systems designed to memorise signatures, graphic symbols, drawings, mathematical symbols, etc., or for the scanning of an original in document copying machines.

Devices according to the present state of the art - one of which is described in U.S. Pat. No. 4,566,779 assigned to the same Assignee of the present invention require, in order to obtain a good quality standard, complex and expensive drive units designed to effect with high precision, and according to exact timing synchronisation, the scanning of the substrate by the reading device.

The object of this invention is to provide an apparatus for reading and reproducing graphic information on a substrate, which will avoid the disadvantages referred to and which can easily be used in conjunction with an operating unit of a simplified kind.

In order to achieve this object, this invention provides a carriage transversely movable with respect to a sheet and mounting a dot matrix printing head and a device of the above specified kind characterised in that it comprises:

a housing body which is able, in use, to effect a scanning movement relative to the said substrate, whereby the reading device scans sequentially successive surface portions of the substrate, light sources mounted in the housing and able to generate beams of light directed towards that portion of the surface of the substrate which the reading device is for the time being scanning, an optical system mounted in the housing, closely adjacent the said sources and designed to frame the said surface portion of the substrate being scanned, and to form an image of the said portion in a predetermined plane located within the casing, and photoelectric sensors mounted in the housing in the said predetermined plane and able to generate electrical signals indicative of the distribution of luminosity of the said image.

Preferably, the device according to the invention comprises an array of sensors each able to generate an electrical signal the level of which is indicative of the level of luminosity of the image of a respective elemental area of the portion of the substrate being scanned at that moment by the reading device.

Thanks to this characteristic, a reading device is provided which is of compact structure and small dimensions, so as to permit its mounting on the head-carrying carriage of a typewriter or a printing machine of the type currently associated with electronic processors, personal computers, video terminals, etc.

According to a further aspect of this invention, the reading device described above is incorporated into an apparatus for reading graphic information on a sheet substrate carried on a cylindrical drum and means for advancing the drum in successive rotational steps of the drum to effect progressive longitudinal advance of the sheet applied to the drum, and a carriage movable in the direction of the axis of the drum and able to effect, upon each rotational step of the said drum, a transverse displacement of the sheet; the said reading device being mounted upon the said carriage, whereby, in use, the reading device scans sequentially successive surface portions of the sheet applied to the drum.

In a further development of the invention, the device above described is incorporated in an apparatus for reading graphic information on a sheet which can moreover effect reproduction of the graphic information read from the said sheet on to another sheet fed successively to the apparatus.

In this case there are also associated with the reading device:

a memory unit for storing electrical signals generated by the said photoelectric sensors, and a printing device mounted on the carriage and controlled, in a known way, by the memory unit in such a manner that the electrical signals sotred in the said memory unit will be reproduced in the form of a graphic symbol on the said other sheet fed successively to the scanning device.

The invention thus makes it possible to produce, in a particularly simple and economical way, and making use partly of components currently in production, such as the roller-head-carrying carriage units of typewriters or printing machines currently in production, readers for facsimile or OCR, input devices for memorising signatures, graphic symbols, drawings and mathematical symbols and equipment for (local) copying of documents.

The invention will now be described, purely by way of non-limiting example, with reference to the appended drawings, in which:

FIG. 2 is a side elevational view, partially cut away and in section, of some elements illustrated in FIG. 1;

Figure 1:
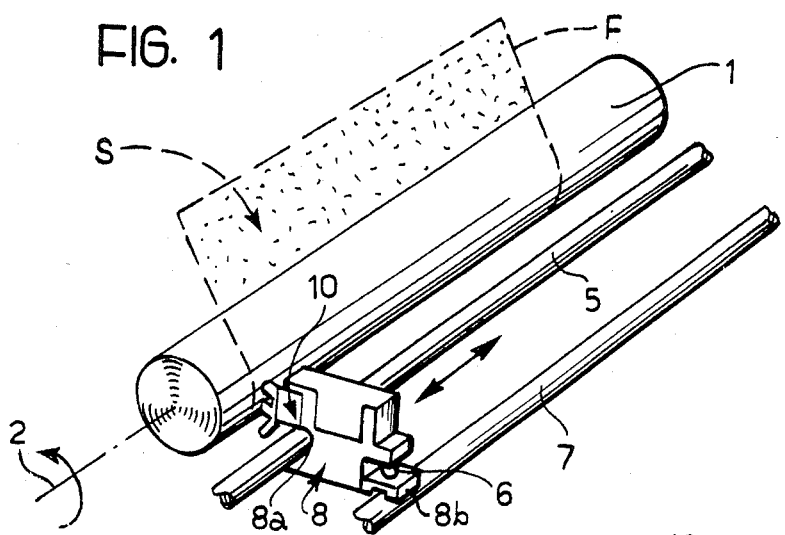
FIG. 1 is a perspective view showing diagrammatically the structure of reading apparatus according to the invention.

FIG. 1 illustrates diagrammatically, and partially, the structure of an apparatus for reading graphic information on a substrate consisting of a sheet F upon which there are printed, typed, handwritten or recorded by any photographic or typographic techniques, characters, graphical signs or symbols of another kind. In this description and in the claims which follow, the said graphic contents, shown as S, are designated generally as "graphic information".

Reference 1 indicates generally a drum to which the sheet F carrying the graphic information to be read is applied.

The drum 1 can be selectively rotated about its main axis 2 by a motorised drive unit of known type (not illustrated).

In use, rotation of the drum 1 is effected in successive angular steps, each of which advances the sheet F longitudinally by an amount corresponding to one line of writing or printing, or to a fraction of such a line.

A carriage indicated generally 8, is movable transversely in alternating movement relative to the sheet F. The movement of the carriage 8 is guided by a bush 8a slidable along a cylindrical guide bar 5 fixed to the sides of the housing of the apparatus (not shown in the drawings) and the longitudinal axis of which is parallel to the axis of rotation of the drum 1.

The carriage 8 also bears, through a pad 8b, upon a second cylindrical guide bar 7, fixed to the sides of the housing of the apparatus, parallel to the guide bar 5. The pad 8b is connected to the carriage 8 through a telescopic joint 6, within which a compression spring 3 is housed. This latter normally holds a spacer 4 against the drum 1, whereby the carriage 8 is maintained at a constant distance from the sheet F.

Associated with the carriage 8 are motor means (not shown) which allow the carriage to be given a fast alternating running movement along the guides 5 and 7.

Under the action of the motor means, the carriage 8 is therefore able to scan completely the longitudinal portions (lines or fractions of lines) of the sheet F which are brought successively, by the rotation of the drum 1, into correspondence with that portion of the outer surface of the roller facing the guide 5.

The structure described is therefore substantially identical to the structure of the transport units of the printing head of printers or of typewriters currently in production.

More particularly, by controlling alternately and in a coordinated manner, the rotation of the drum 1, and sliding of the carriage 8 on the guides 5 and 7, the carriage 8 can effect a scanning movement of the sheet F. This movement brings the carriage into register successively with surface portions of the sheet F ordinately adjacent each other.

In the drawings there is shown a reading device indicated generally 10 mounted on the carriage 8.

As a result of the superposition of the rotational movement of the drum 1 and of the translational movement of the carriage 8 on the guides 5 and 7, the device 10 is therefore able to perform a coordinated scanning action of the surface of the sheet F carrying the graphic information S to be read.

Figure 3:
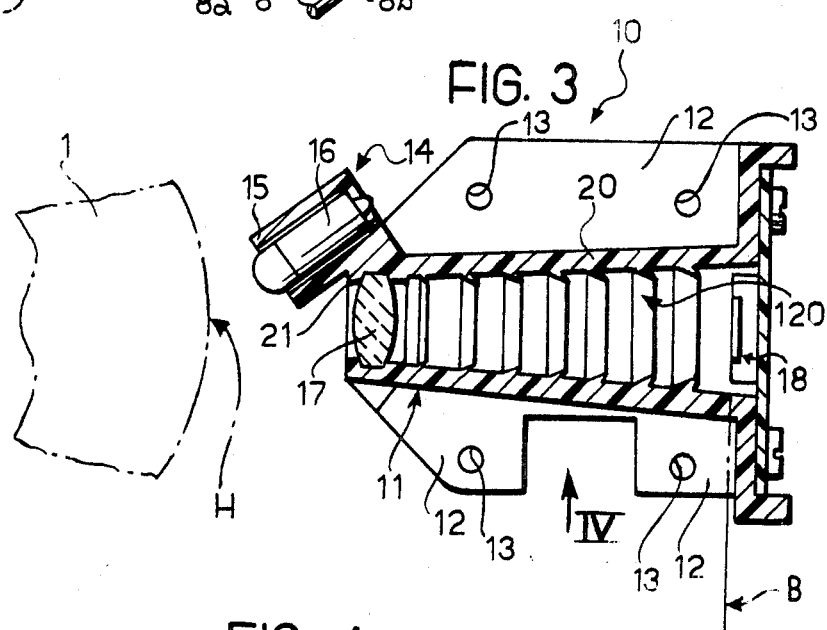
FIG. 3 illustrates a variant of some of the elements illustrated in FIG. 2.
Figure 4:
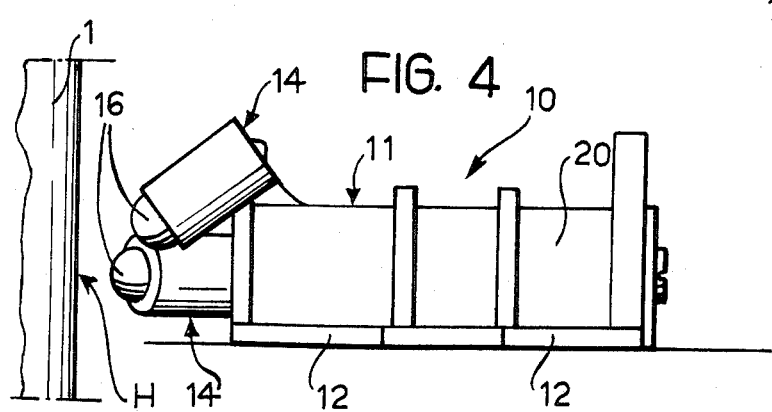
FIG. 4 is a view in the direction of the arrow IV of FIG. 3.

In its general configuration, common both to the embodiment of FIG. 2 and to the variant of FIGS. 3 and 4, the device 10 has a housing and support body 11 of moulded plastics material provided with flanges or like connecting elements which permit its assembly upon the carriage 8. Flanges 12, provided with holes 13 for the passage of fixing screws, can be more plainly seen in the variant of FIGS. 3 and 4.

From the "front" portion of the body 11, that is to say that portion which faces towards the drum 1 when the device 10 is mounted on to the carriage 8, there extend a plurality of (typically two or three) support bracket elements 14. Each of these elements has at its free end a tubular part 15 provided with a longitudinal slot 15a which imparts to this part 15 a certain radial elastic yieldability. The main axis of each tubular part 15 intersects, ideally, the main axes of the tubular parts 15 provided on the other bracket elements 14 at a point H. When the device 10 is assembled on the carriage 8, the point H will lie practically on the surface of the drum 1, that is to say, on the surface of the sheet F.

Each tubular part 15 acts as a mounting seat for a respective light source 16 consisting of a microlamp or of an LED (Light Emitting Diode). Each light source 16 is easily inserted into the respective tubular part 15, making use of the elastic yieldability of same, which also makes it possible to adjust with precision the position of the light source during operation.

The light sources 16 are fed from an electrical power supply (not ilustrated) through electrical conductors attached to the body 11 and not plainly visible in the drawings.

When activated, the sources 16 project respective light beams which converge onto that region of the sheet F at which—at that moment—the point H is located.

The expression "at that moment" refers to the fact that the illuminated portion of the sheet, which is that on which reading of the graphic information S takes place, changes continuously due both to the sliding movement of the carriage 8 upon which the device 10 is assembled and to the progressive rotational movement of the drum 1 which results in a corresponding advance of the sheet F.

In the embodiment of FIG. 2, each bracket element 14 constitutes a separate piece mounted on the body 11 by means of a screw 114, in such a way that, by rotating the bracket element 14 about the axis of the screw 114, it is possible to adjust with precision the relative position of the respective source 16 relative to the body 11 and to the point H on the drum 1.

In the embodiment shown in FIG. 3, which allows greater speed and economy of manufacture, the bracket elements 14 and the tubular parts 15 constitute integral appendages of the body 11, made from moulded plastics material.

In both embodiments, in the front portion of the body 11 there is provided, in a position central in relation to the bracket elements 14 and to the light sources 16, an annular recess which forms a mounting seat for a lens 17 of glass or plastics material.

The lens 17 is mounted closely adjacent the sources 16 and is so arranged that the focal axis of the lens 17 passes through the point of convergence H of the radiation beams emitted by the sources 16.

In use, the distance between the device 10 and the surface of the drum 1, that is to say, the distance between the device 10 and the surface of the sheet F, is so adjusted that the lens 17 forms, in a predetermined plane, indicated B in the drawings, a flat image of the surface portion of the sheet F which the device 10 is at that moment facing. In other words, the lens 17 "frames" that portion of the sheet F which at that moment is illuminated by the sources 16, forming in the plane B a flat image of that portion of the sheet.

One can generally distinguish in the image areas of different luminosity arranged with a distribution which reproduces the distribution of luminosity on the portion of the sheet F at the moment viewed by the lens 17.

For example, in the case in which there are present on the sheet F printed or typed characters in black and white, then the image formed in the plane B will have dark (low luminosity) areas corresponding to those areas of the sheet covered by ink and light (high luminosity) areas corresponding to the "white" areas of the sheet.

In the case in which the sheet F carries graphic information with grey levels, then the image formed in the plane B will have areas exhibiting corresponding levels of intermediate luminosity.

In other words, the image formed in the plane B can ideally be subdivided into elemental areas, each of which has a level of luminosity corresponding to the level of luminosity of a corresponding elemental area of the portion of sheet F at that moment being viewed by the lens 17. The level of luminosity of each of these elemental areas and of the respective image in the plane B corresponds in fact to the intensity of that fraction of the light emitted by the sources 16 which is reflected by the said elemental area.

The optical characteristics of the lens 17 are selected so that the image plane B is within the body 11, that is to say, in a region comprised within the outer envelope of the body 11.

Consequently there can easily be assembled on the body 11 a linear array 18 of photoelectric sensors on to which there is incident the radiation reflected at the sheet F and focussed by the lens 17. Preferably the array 18 is so oriented that, when the device 10 is mounted upon the carriage 8, the direction of alignment of the sensors will be orthogonal to the direction of movement of the carriage 8 on the guides 5 and 7. This sensor arrangement permits the operation of reading the graphic information to be carried out in a way which allows its subsequent reproduction with a point matrix printing device.

The array 18 of sensors can be formed by an array of photodiodes or phototransistors or by an array of CCD (Charge Coupled Devices).

The position of the lens 17 relative to the point H, the position of the plane B relative to the lens 17, and the optical characteristics of the lens, can be so selected that the image formed in the plane B constitutes an enlarged or reduced image, or an image with magnification of only that portion of the sheet F being viewed at the moment by the lens 17.

If photodiodes or phototransistors are used to form the array 18, the optical system consisting of the lens 17 and the sensors of the array 18 will normally be made in such manner that a single transducer of the array 18 is illuminated by the light reflected by a single corresponding elemental area of that portion of the sheet being scanned.

There is then a unique inter-relation between the elemental areas of that portion of the sheet F being viewed at the moment and the sensors of the array 18, each of which detects the luminosity of a respective elemental area.

If arrays of CCD are used, which usually have smaller sensing surfaces, one can adopt a solution in which the light reflected by a single elemental area of the sheet F is incident on several sensors adjacent each other. The luminosity of each elemental area is then detected by several sensors.

Figure 5:
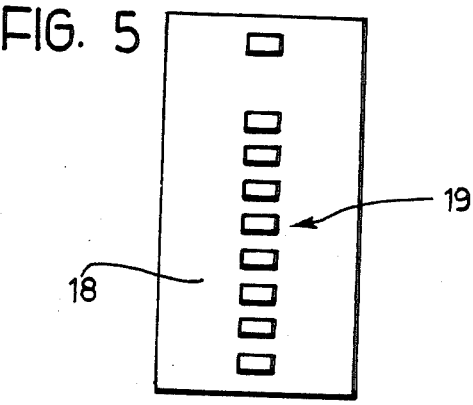
FIG. 5 illustrates diagrammatically the structure of one of the elements illustrated in FIGS. 2 and 3.

In FIG. 5 there is illustrated diagrammatically the structure of a linear array 18 of photodiodes which can be used in the fabrication of the reader device 11.

In the embodiment to which this figure refers, the array 18 of sensors has eight sensing areas or pixel elements 19, rectangular in shape with dimensions of 0.33×0.24 mm.

The sensors of the array 18 have a sensitivity of the order of about 0.5 A/W at a wavelength of about 790 nm with a maximum sensitivity at about 820 nm.

The cross-talk between adjacent sensors is less than 3% of the maximum signal picked up by the sensors.

In the region between the lens 17 and the photodiode array 18, the body 11 has a tubular duct 20 which encloses the volume in which light is propagated from the lens 17 towards the photosensor array 18. This arrangment is intended to minimise the influence of ambient luminosity on the reading quality.

In the embodiment of FIG. 2, the duct 20 consists of two tubular elements 20a and 20b coupled together telescopically.

The duct section 20a, disposed in front of the housing body, is provided at the end located adjacent the bracket elements 14 with the annular recess in which the lens 17 is mounted. The corresponding terminal edge of the duct section 20a has a flange part 21 which extends partially over the face of the lens 17 which faces towards the outside of the body 11. The flange part 21 acts as a stop and as a resilient element for the mechanical retention of the lens 17 in the respective annular recess.

Referring to the embodiment of FIG. 2, it will be noted that the position of assembly of the duct section 20b in relation to the body 11 (and, consequently, in relation to the duct section 20a) can be adjusted by acting upon a support element 22 comprising an appendage of the duct section 20b.

The element 22 has an elongate opening or slot 23 through which a fixing screw 24 extends, the screw 24 being received in a corresponding threaded hole in the body 11. The position of the body 11, and hence of the duct section 20a and of the lens 17 fixed to it, is fixed in an adjustable manner relative to the point H by slots 14a, 14b, and 14c in which respective fixing screws engage.

The position of the duct section 20b, and of the sensor array fixed to it, is adjustable relative to the lens 17 by sliding the duct section axially by virtue of the slot 23 and the telescopic coupling with the duct section 20a. When the correct position is reached, the duct section 20b is locked by tightening the screw 24.

By adjusting the relative position of the duct sections 20a and 20b it is possible to ensure correct focussing of the photodiode array 18 relative to the lens 17. This adjustment, and the adjustment of the position of the lens 17 relative to the point H, makes it possible to compensate exactly the errors of magnification and/or of focussing arising from small departures of the focal length of the lens from its nominal value.

In the embodiment of FIG. 3, which is structurally simpler, the tubular duct 20 consists of a shaped part of the housing body 11, integral with the bracket elements 14 which support the light sources. In this case, also, the duct 20 terminates at the end facing towards the bracket elements 14 in a flange part 21 forming a seat for positioning on the outer face of the lens 17 and acting as a stop and as a resilient retaining element for the lens. The internal surface of the duct 20 has, moreover, annular corrugations 120 designed to minimise phenomena of reflection of light within the duct.

The reader device according to the embodiment of FIG. 3 is thus not provided with any means for adjusting the position of the sensor array 18. In order to avoid possible inaccuracies in reading arising from errors of magnification and/or of focussing the lenses 17 used are selected with a narrow range of variation of focal length.

Alternatively it is possible to effect compensation by adjusting the position of the sensors of the array 18.

In fact, the most critical operating situation occurs in the case in which there exists a unique inter-relation between the sensors of the array 18 and the elemental areas into which, ideally, the portion of sheet F viewed by the lens 17 is subdivided. In this case one can then use sensors having sensitive surface areas which are smaller in relation to the surface of the image of the corresponding elemental areas in the plane B. In this way the sensitive area is always included within the superficial extent of the image of the elemental area, even when a positive or negative magnification error occurs.

The light reflected by each elemental area of the sheet is conveyed by the lens 17 towards the sensor array 18, where it is incident on a corresponding sensor. This sensor outputs an electrical current or voltage signal the level of which is proportional to the intensity of the light which impinges on it, and hence to the level of luminosity of the corresponding elemental area.

Each sensor of the array 18 emits an electrical analog signal which is compared with a reference level and converted into a binary numerical signal in the case of black and white reading. In the case in which reading of greys is also provided for the reference levels are those of the grey tones under consideration.

This conversion operation is effected, in a known way, by an analog/digital converter which generates from the analog signals provided by the sensors of the array 18, strings of binary signals constituting a numercial reading of the graphic information on the sheet F.

The converter can also effect a processing operation upon the said strings of binary signals so as to vary the reading resolution without having to vary the geometry of the reading device 10.

This operation can be carried out by effecting a "decimation" or an "interpolation" of the samples obtained from the analog signals emitted by the sensors of the array 18.

For example, if the array 18 consists of CCDs with a scanned sensor/elemental area ratio greater than one, it is possible to vary the reading resolution by varying the sampling frequency of the analog signal at the output of the CCDs, or by using exclusively the signals provided by transducers spaced according to the selected resolution.

If CCDs or photodiode arrays are used in unique inter-relation with the elemental areas scanned, one can vary the reading resolution by re-sampling the analog signal output by the array 18, for example by an analog multiplexer.

In simpler cases it is possible to reduce the reading resolution by suppressing one sample in two, or one sample in three, etc., of those output by the converter. On the contrary it is possible to increase the resolution, for example by duplicating each elementary sample, or by duplicating every second sample, etc. In this way a very simple conversion or resolution is achieved, even with imperfect graphical rendition.

Numerical signals emitted by the converter associated with the reading device can therefore be subjected to further processing operations.

For example, in the case of a facsimile reader the signals are sent to the unit (modem) which effects the distant transmission of the said signals.

In the case of application to the memorisation of signatures, graphics, drawings, mathematical symbols, such signals can be sent to processor units which store, process and possibly reproduce them on a video terminal or on a printing unit. In the case of the reading of signatures, the signals emitted by the converter can be subjected to a verisimilitude test aimed at recognition of the said signature.

Figure 6:
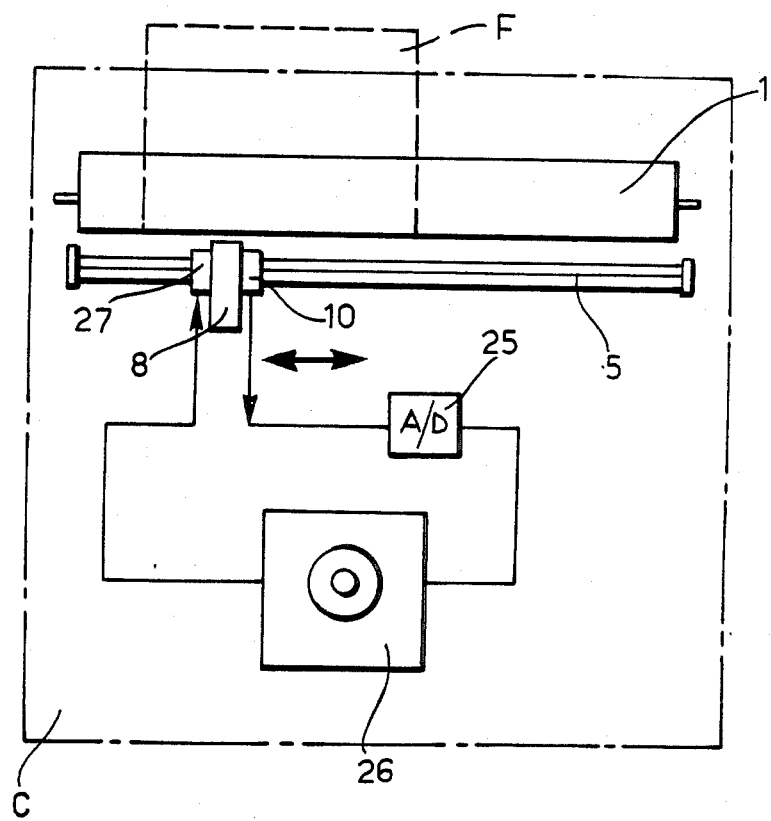
FIG. 6 illustrates diagrammatically the structure of a document copying machine incorporating the invention.

FIG. 6 illustrates diagrammatically the structure of a machine for the (local) reproduction of documents. In the apparatus C the reader device 10 is mounted upon a carriage 8 moveable longitudinally relative to a drum 1 for supporting and advancing the sheets 1, with a configuration similar to that illustrated in FIG. 1. The analog signals emitted by the photoelectric sensors of the device 10 are sent to an analog/digital converter 25 which, after having converted them into numerical signals, and having possibly subjected them to other processing operations (changing of the resolution, etc. . . . ) transmits them to a memory unit 26 consisting, for example, of a small disk memory.

The memory 26 controls, through control and actuating devices of known type, currently mounted on printers and typewriters of sophisticated type in standard production, the operation of a printer head 27 mounted on the carriage 8 adjacent the reader device 10.

The operation of the copying machine of FIG. 6 is as follows.

The sheet carrying the graphic information which it is desired to reproduce ("original" sheet) is applied to the drum 1 according to the criteria normally used in printers and in typewriters.

In the reading phase, which takes place in an ordered sequence of rotational steps of the drum 1 and of horizontal scanning movements of the carriage 8, the device 10 scans the surface of the sheet and the converter 25 generates corresponding numerical reading signals which are stored in the memory 26.

At the end of the reading operation, the "original" sheet is removed from the drum 1 and replaced by a blank sheet upon which it is wished to reproduce the graphic information previously read.

The operation of the apparatus thus proceeds according to operating criteria currently in use in printing machines and in typewriters provided with memories. The numerical signals stored in the memory 26 are transmitted in an ordered sequence to the printing head 27 which effects an overlapped line scanning movement over the new sheet by virtue of the coordinated movement of the drum 1 and of the carriage 8. At the end of this new scanning operation, there will have been completely reproduced upon the drum 1 the graphic information previously read from the "original" sheet. One thus has available a reproduction of the said original.

Naturally, while the principle of the invention remains the same, details of carrying it out and embodiments can be widely varied in relation to what has been described and illustrated, without nevertheless going beyond the scope of the present invention.

What is claimed is:

1. An apparatus for reading and reproducing graphic information comprising a cylindrical platen for supporting a sheet, advancing means for controlling the rotation of said platen in successive steps to effect a progressive longitudinal advancement of said sheet, a reciprocating carriage parallel to the axis of said platen to effect at each rotational step of said platen a transverse scanning movement with respect to said sheet, a dot matrix printing head mounted on said carriage for printing on said sheet a plurality of matrix dots arranged in a printing column parallel to said advancement, a dot sensing head including a plurality of photoelectric sensors for reading on said sheet a plurality of elemental areas arranged in a reading column corresponding to said printing column and each able to generate an electric signal indicative of the luminosity of the image in the elemental area being sensed, said sensors being arranged in a predetermined plane parallel to said reading column and said axis, at least a pair of light sources mounted within said housing for generating light beams intersecting on said reading column, an optical system mounted closely adjacent to said sources to form an image of the reading column in said predetermined plane, and housing means for mounting inside said sensors, said light sources and said optical system, said housing means being mounted on said carriage so that said light sources can direct the light beams toward a reading column adjacent and parallel to the printing column faced by said printing head.

2. An apparatus as defined in claim 1, wherein said housing means are carried by vertical flanges adapted to be removably secured to a side surface of said carriage perpendicular to said axis.

3. An apparatus as defined in claim 2, for reading graphic information upon a sheet and for reproducing the graphic information read from said sheet onto a further sheet subsequently fed to said apparatus, the apparatus further comprising:
   a memory unit for storing the electrical signals generated by the said photoelectric sensors, and
   a printing device mounted upon said carriage and controlled by said memory unit so that the electrical signals stored in the memory unit are reproduced in the form of graphic signs upon said further sheet.

4. An apparatus as defined in claim 2, wherein said housing means is formed of a single body integral with said vertical flanges and made of molded non-transparent plastics having non-reflecting outer surfaces, said body including a tubular duct extending between said optical system and said photoelectric sensors and constituting clamping elements for said optical system, and at least a pair of converging tubular seats for said light sources, the internal surface of said duct being provided with corrogations concentric with said duct to eliminate reflection at said internal surface.

5. An apparatus as defined in claim 2, wherein said housing means include a first tubular duct integral with a first vertical flange, said optical system including a lens mounted on a terminal edge of said first tubular duct, said edge extending partially over the face of said lens to resiliently clamp said lens, said housing means including a second tubular duct integral with a second vertical flange and mounting said plurality of sensors, said flanges being adjustably mounted on said carriage as to telescopically couple said first and said second tubular ducts to adjust the distance of said predetermined plane from said lens for altering the magnification factor of an image formed on said plane.

6. An apparatus as defined in claim 5, wherein said housing means also include a pair of tubular seats for said light sources, said seats being mounted on said first flange in an angularly adjustable position to adjust the distance of the intersecting point of light beams from said lens.

7. An apparatus as defined in claim 6 wherein the distances between said sensors and said lens and the magnification factor of said optical system are selected so that the luminosity level of the image of said elemental area of the reading columns being scanned is picked up by only one of the said sensors, each sensor having a photosensitive zone of smaller area than the area of the image of the corresponding elemental area formed in the said predetermined plane of the optical system irrespective of said magnification factor.

* * * * *